United States Patent [19]
Nonaka et al.

[11] 3,923,319
[45] Dec. 2, 1975

[54] STEERING APPARATUS FOR VEHICLES

[75] Inventors: Masakatsu Nonaka; Toshi Onuma, both of Toyota, Japan

[73] Assignee: Toyota Jidosha Kogyo Kabushiki Kaisha, Japan

[22] Filed: June 24, 1974

[21] Appl. No.: 482,579

[30] Foreign Application Priority Data
July 4, 1973 Japan.................................. 48-75359

[52] U.S. Cl..................... 280/87 R; 74/492; 180/78; 280/150 B
[51] Int. Cl.²........................................... B62D 1/18
[58] Field of Search ............ 280/87 R, 87 A, 150 B; 180/78; 74/493, 492

[56] References Cited
UNITED STATES PATENTS

| | | | |
|---|---|---|---|
| 3,392,599 | 7/1968 | White............................ | 280/87 R X |
| 3,470,761 | 10/1969 | Okamoto et al................. | 180/78 X |
| 3,502,346 | 3/1970 | Cadlou........................... | 280/87 R |
| 3,505,897 | 4/1970 | Scheffler et al.................. | 74/492 |
| 3,556,550 | 1/1971 | Franchini...................... | 74/493 X |
| 3,580,101 | 5/1971 | Jorgenson..................... | 280/87 A X |
| 3,597,994 | 8/1971 | Shiomi.......................... | 74/492 |
| 3,678,777 | 7/1972 | Olsen........................... | 280/150 B X |

Primary Examiner—Leo Friaglia
Assistant Examiner—John P. Silverstrim
Attorney, Agent, or Firm—Stevens, Davis, Miller & Mosher

[57] ABSTRACT

In a steering apparatus of a vehicle, a column tube assembly coaxially surrounding and journalling a foldable steering shaft assembly therein is supported at its lower and upper portions on a vehicle body structure by way of a front and a rear brackets to permit a forward displacement thereof and separated at its lower end from a toe-board of the vehicle compartment in a predetermined distance. In a vehicle collision, the column tube assembly displaces forwardly by a secondary impact energy exerted thereon and swings upwardly or downwardly around a portion of the rear bracket to absorb the secondary impact energy by the function of an impact energy absorbing member assembled within said column tube assembly.

9 Claims, 11 Drawing Figures ic energy absorbing device.

STEERING APPARATUS FOR VEHICLES

BACKGROUND OF THE INVENTION

The present invention relates to a steering apparatus of a vehicle, and more particularly to an improvement of the steering apparatus provided with an impact energy absorbing device.

There have been introduced various impact enerby absorbing devices for a steering apparatus to protect the operator of the vehicle from injury in an occurrence of a vehicle collision. For example, proposed is an impact energy absorbing device which comprises an axially retractable steering shaft assembly connected at its upper and lower ends respectively to a steering wheel and to a steering gear, an axially retractable tubular steering column assembly coaxially surrounding and journalling the steering shaft assembly therein, and an impact energy absorbing member plastically deformable only in the forward or downward direction for supporting the steering column assembly on a portion of the vehicle therethrough.

As the tubular steering column assembly is mounted at its lower end on a toe-board of the vehicle, there have been found such problems as the impact energy absorbing member is pushed upward by twisting or bending moment caused by the big displacement of the steering gear toward the vehicle compartment in an occurrence of a vehicle collision. The bending or twisting moment is also produced by the secondary impact energy given to the steering wheel diagonally from the back-ward by the operator in the vehicle collision. Thus, the tubular steering column assembly may be prevented from its axial displacement in the secondary impact energy absorbing operation. In other words, with the mentioned type of impact energy absorbing device, the secondary impact energy may not be absorbed as it should be or the safety operation is remarkably disabled by influence of the primary impact energy.

SUMMARY OF THE INVENTION

The primary object of the present invention is therefore, to provide a steering apparatus of a vehicle wherein secondary impact energy can smoothly be absorbed to protect the operator in an occurrence of a vehicle collision regardless of any moment acting on the steering shaft assembly by the steering gear in a primary collision.

Another object of the present invention is to provide a steering apparatus of a vehicle wherein a column tube assembly journalling therein a foldable steering shaft assembly is supported at its lower and upper portions on a vehicle body structure by way of a front and a rear supporting means to permit a forward displacement thereof and separated at its lower end from a toe-board of the vehicle compartment in a predetermined distance, whereby in a vehicle collision the column tube assembly displaced forwardly by a secondary impact energy exerted thereon and swings upwardly or downwardly around a portion of the rear supporting means to absorb the secondary impact energy by function of an impact energy absorbing member assembled within said column tube assembly.

A further object of the present invention is to provide a steering apparatus of a vehicle, having the above-mentioned characteristics, wherein an impact energy absorbing member is interposed between the lower portion of the column tube assembly and the vehicle body structure to absorb the upward or downward rotating force caused by the swinging movement of the column tube assembly.

BRIEF DESCRIPTION OF THE DRAWINGS

These and further objects, features and advantages of the present invention will become more apparent when reading the following detailed description of the invention by reference to the accompanying drawings illustrative of several preferred embodiments of the invention.

In the drawings.

DESCRIPTION OF THE PREFERRED EMBODIMENT

Figure 1:
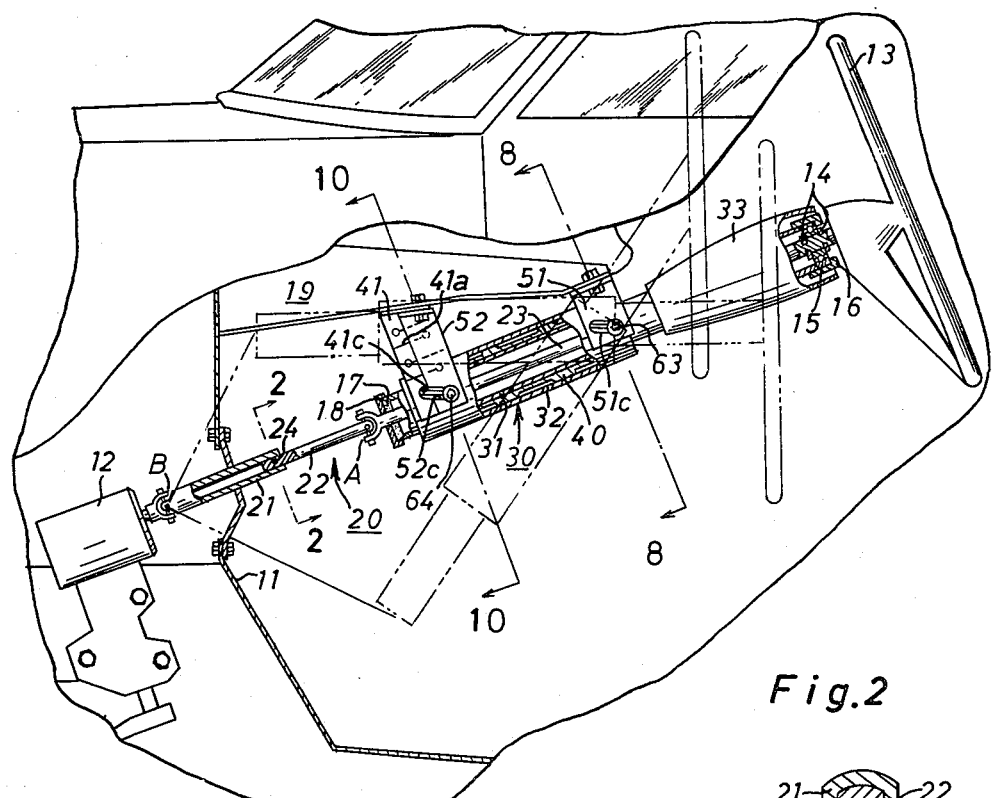
FIG. 1 is a partially borken side view of a steering apparatus in accordance with the present invention.

A preferred embodiment of the present invention is hereinafter described in reference with the accompanying drawings. Referring now to FIG. 1, a steering shaft assembly 20 includes a lower shaft 21 and an intermediate shaft 22 which are non-rotatably coupled to permit axial relative displacements. The steering shaft assembly 20 further includes an upper shaft 23 connected to the intermediate shaft 22 by way of a universal joint A. On the top end of the upper shaft 23, a conventional collapsible steering wheel 13 is mounted.

Figure 2:
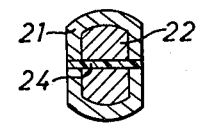
FIG. 2 shows an enlarged cross-section taken along line 2—2 in FIG. 1.

The lower shaft 21 is connected at its lower end to a conventional gear box 12 by way of a universal joint B and penetrates slidably a fire-wall 11 forming a front wall of a vehicle compartment. The upper portion of the lower shaft 21 is designed to have a bore of a substantially oblong cross-section as well illustrated in FIG. 2. The bore receives therein the lower portion of the intermediate shaft 22 axially slidably but non-rotatably for torque transmission. The lower portion of the intermediate shaft 22 is normally prevented from its axial displacement by means of a shearable pin 24.

Figure 5:
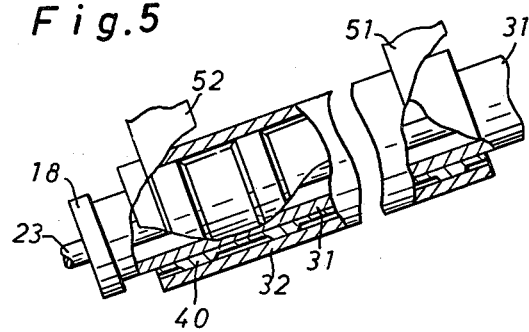
FIG. 5 is an enlarged partially broken side view of the column tube assembly shown in FIG. 1.
Figure 8:
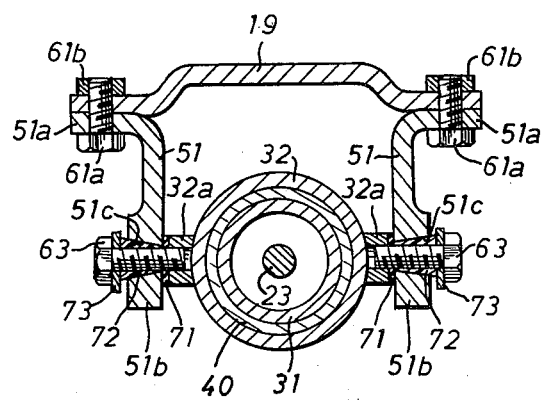
FIG. 8 is an enlarged cross-sectional view taken along line 8 — 8 in FIG. 1.
Figure 9:
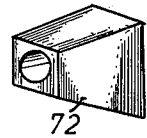
FIG. 9 is an enlarged perspective view of the spacer shown in FIG. 8.
Figure 10:
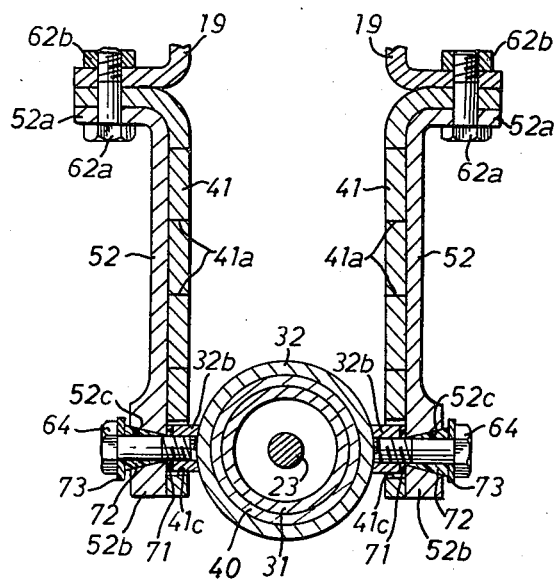
FIG. 10 is an enlarged cross-sectional view taken along line 10 — 10 in FIG. 1.

A column tube assembly 30 comprises an inner column tube 31 surrounding the upper shaft 23, and an outer column tube 32 coupled over the lower half of the inner column tube 31 through a cylindrical type of a first impact energy absorbing member 40. This impact energy absorbing member 40 is integrally secured on the lower half of the inner column tube 31 as shown in FIG. 5. On the outer periphery of the energy absorbing member 40, the inner periphery of the outer column tube 32 is frictionally and axially slidably engaged for impact energy absorbing operation. As seen in FIG. 8, a pair of rear bosses 32a are radially and horizontally welded on the both sides of the upper portion of the outer column tube 32, meanwhile at the both sides of the lower portion of the outer column tube 32 welded are a pair of front bosses 32b radially and horizontally as shown in FIG. 10.

The inner column tube 31 journals therein the top portion of the upper shaft 23 at its upper end by way of a bearing 15 mounted on the upper shaft 23 by snap rings 14 within a bearing cap 16. The cap 16 is covered by a breakable column cover 33 of which the lower portion is secured on the inner column tube 31. At the lower end of the inner column tube 31, the upper shaft 23 is supported by a tapered deformable bush 17 clamped by a bush cap 18 threaded on the lower end of the inner column tube 31.

Referring back to FIG. 1, the column tube assembly 30 is hung at the upper and lower portions of the outer column tube 32 by two pairs of rear and front brackets 51 and 52 discussed in detail hereinafter, which are fixedly mounted on a pedal bracket 19 of the vehicle. The pedal bracket 19 has a U-shaped cross-section and is horizontally secured at its front end on the fire-wall 11 towards the rearward direction.

As clearly shown in FIG. 8, each of the rear brackets 51 is an L-shaped member having a horizontal flange 51a and a leg portion 51b extended downwardly from the flange 51a. At the rear portion of the pedal bracket 19, the flanges 51a are secured on the flanges provided with the both sides of the pedal bracket 19 by means of bolts 61a and nuts 61b. Each of the leg portions 51b is provided with an elongated hole 51c tapered inwardly in the figure. These elongated holes 51c are positioned to be horizontal when the brackets 51 are duly assembled as shown in FIG. 1. Thus, each of the rear bosses 32a of the outer column tube 32 is assembled on the corresponding bracket 51 by a fastening bolt 63 threaded in the boss 32a by way of a synthetic resin spacer 71 interposed between the boss 32a and the bracket leg portion 51b, a sliding spacer 72 engaged within the elongate hole 51c and a washer 73 positioned between the sliding spacer 72 and the head of the bolt 63. In the impact energy absorbing operation, the bolt 63 and the sliding spacer 72 are forwardly slided within the elongated holes 51c to function as pivot element.

As well illustrated in FIG. 10, each of the front brackets 52 is an L-shaped member having a horizontal flange 52a and a leg portion 52b. Along the inside of each bracket 52 is a second expansible impact energy absorbing member 41 of a shape corresponding to the bracket 52 with a wider width than that of the bracket 52. This second impact energy absorbing member 41 includes a plurality of horizontal slits 41a to be expanded by downward force exerted thereon. At the middle portion of the pedal bracket 19, the flanges 52a of the brackets 52 are secured on the flanges provided at the both sides of the pedal bracket 19 together with the second impact energy absorbing member 41 by way of bolts 62a and nuts 62b. Each of the front brackets 52 is provided with an elongated slot 52c at the bottom portion thereof. This elongated slot 52c is open at its front end and positioned to be horizontal when the bracket 52 is duly assembled as shown in FIG. 1. The second impact energy absorbing member 41 is provided with a corresponding elongated hole 41c at the corresponding position to the elongated slot 52c, the front end of the hole 41c being closed and extended forwardly from the front end of the slot 52c. Thus, each of the front bosses 32b of the outer column tube 32 is assembled on the corresponding bracket 52 through the elongated hole 41c of the second energy absorbing member 41 by means of a fastening bolt 64 threaded in the boss 32b by way of the synthetic resin spacer 71 interposed between the boss 32b and the bracket leg portion 52b, the sliding spacer 72 engaged within the elongated slot 52c and the washer 73 positioned between the sliding spacer 72 and the head of the bolt 64. In the impact energy absorbing operation, the bolt 64 and the sliding spacer 72 are forwardly moved along the elongated slot 52c and hole 41c and received by the front end of the hole 41c to expand the second energy absorbing member 41 downwardly.

In operation, while the vehicle is normally travelling, various road conditions may give vibrations to the gear box 12 and accordingly some bending moments or pushing forces may act on the steering shaft assembly 20. In this instance, the given bending moments or pushing forces are received by the pedal bracket 19 by way of the column tube assembly 30 and the front and rear brackets 52 and 51. Thus, the steering shaft assembly 20 is duly held in its position regardless of the bending moments and/or pushing forces due to the sliding spacers 72 tightly engaged within the holes 51c and the slots 52c respectively of the brackets 51 and 52.

In a vehicle collision, when the gear box 12 may have a big displacement toward the vehicle compartment, the lower shaft 21 moves backwardly or upwardly along the intermediate shaft 22 by breakage of the shearable pin 24. At the same time, the lower and intermediate shafts 21 and 22 are freely swung in any direction by way of the universal joints A and B so as to maintain the original assembling condition of the column tube assembly 30 regardlessly of the deformation of the vehicle body caused by a primary collision.

Immediately after the primary collision, a secondary collision will take place when the operator hits the steering wheel 13 with his body. Then, the steering wheel 13 collapses and the column tube assembly 30 displaces forwardly and horizontally along the elongated holes 51c of the brackets 51 and the elongated slots 52c of the brackets 52. In this instance, at the rear brackets 51, the fastening bolts 63 are engaged at the front ends of the elongated holes 51c, meanwhile at the front brackets 52, the fastening bolts 64 are disengaged from the front opening ends of the slots 52c and received by the front ends of the elongated holes 41c of the second impact energy absorbing members 41 to permit the downward movement of the lower portion of the column tube assembly 30. Thus, the column tube assembly 30 is rotatably pivoted at its rear end by the engagements of the bolts 63 with the front ends of the holes 51c, and the pivoted bolts 63 are positioned below the top end of the inner column tube 32 on which the secondary collision is directly given. This rotates the column tube assembly 30 counterclockwisely around the pivoted bolts 63 by the bending moment exerted on the inner column tube 31 upon the occurrence of the secondary collision as a two-dot and solid line seen in FIG. 1 and, in turn, the rotating force caused by the rotation of the column tube assembly 30 is absorbed by expanding the plural slits 41a of the second energy absorbing member 41 on which the bolts 64 are previously supported by the front ends of the holes 41c. Simultaneously, the inner column tube 31 is pushed downwardly by the secondary impact energy exerted thereon from the collapsed steering wheel 13 to brake the column cover 33 and further displaced downwardly within the outer column tube 32 to cause the sliding friction between the first energy absorbing member 40 and the outer column tube 32. This sliding friction absorbs the secondary impact energy.

In the above-disclosed embodiment, the steering wheel 13 is collapsed and the column tube assembly 30 rotates counterclockwise in the secondary impact energy absorbing operation. In case, however, a non-collapsible steering wheel is assembled, the acting point of the bending moment is positioned below the pivoted bolts 63. Thus, after the bolts 63 are received by the front ends of the elongated holes 51c and the bolts 64 are disengaged from the front ends of the slots 52c, the column tube assembly 30 swings upwardly or clockwise about its pivoting point of the bolts 63 as shown by a three-dot and solid line in FIG. 1. In this instance, the second impact energy absorbing member 41 may be eliminated or replaced with another impact energy absorbing member plastically deformable by clockwise rotation of the column tube assembly 30.

Figure 3:
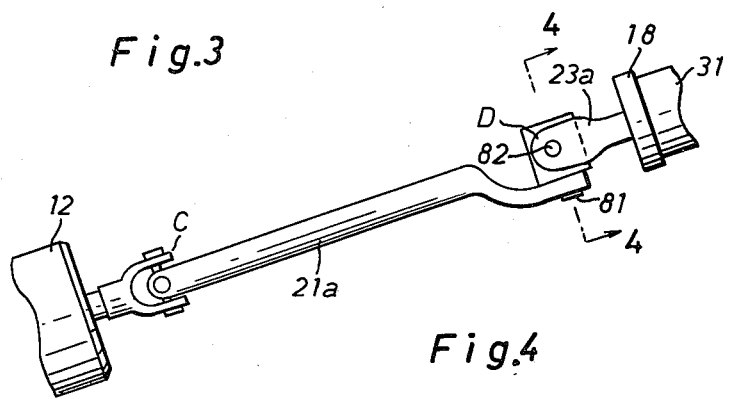
FIG. 3 is an enlarged side view of a modification of the steering shaft assembly shown in FIG. 1.
Figure 4:
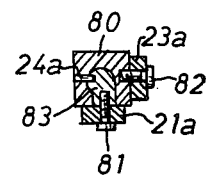
FIG. 4 is a cross-sectional view taken along line 4 — 4 in FIG. 3.

FIGS. 3 and 4 disclose a modification of the above-disclosed embodiment, wherein a universal joint C and a shearable connecting means D replace the two universal joints A and B and the intermediate shaft 22. The connecting means D comprises a casing 80 provided with a substantially square cross-section and a bore of which the bottom is open. A sliding member 83 is sungly engaged within the bore and an arm portion of a lower shaft 21a is fixed on the sliding member 83 by a pin 81. An arm portion of an upper shaft 23a is mounted on one side of the casing 80 by a pin 82. The sliding member 83 is normally held in its position by a shearable pin 24a inserted through the other side of the casing 80. Upon occurrence of the primary collision, the shearable pin 24a is broken to release the sliding member 83 which, in turn, slides within the casing 80 to disconnect the lower shaft 21a from the upper shaft 23a. Consequently, no deformation of the vehicle body caused by the primary collision is affected upwardly to the column tube assembly 30.

Figure 6:
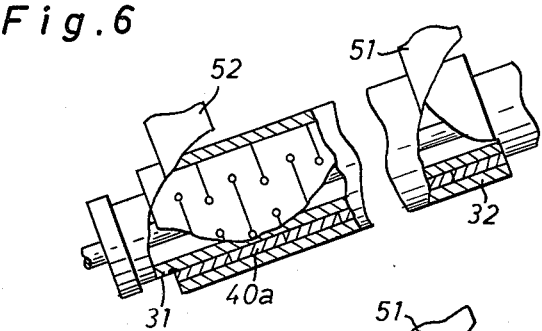
FIGS. 6 and 7 depict modifications of the column tube assembly.

FIG. 6 discloses a modification of the impact energy absorbing member 40 of the above disclosed embodiment, wherein an impact energy absorbing member 40a is provided with a plurality of slits for expansion thereof in its energy absorbing operation. This impact energy absorbing member 40a is welded at its lower end onto the outer periphery of the inner column tube 31 and at its upper end onto the inner periphery of the outer column tube 32. Thus, the impact energy absorbing member 40a is expansible forwardly to absorb the secondary impact energy.

Figure 7:
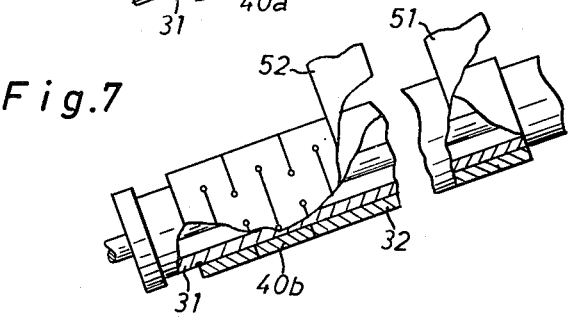

Another modification of the impact energy absorbing member 40 is disclosed below in reference to FIG. 7. An impact energy absorbing member 40b is integral with the outer column tube 32 on which a plurality of slits are drilled at its lower portion. In this instance, the lower end of the impact energy absorbing member 40a is welded on the outer periphery of the inner column tube 31 so that the same energy absorbing function is provided as in the case of the modification of FIG. 6.

Figure 11:
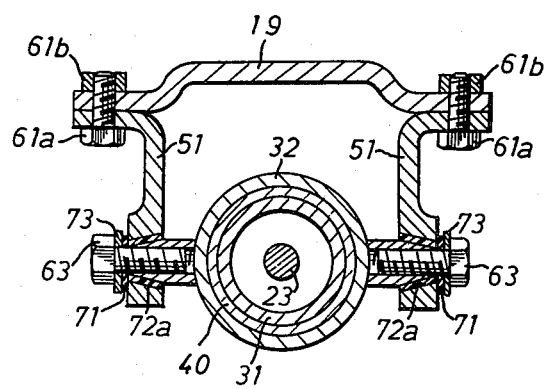
FIG. 11 illustrates a modification of the spacers and the bosses shown in FIG. 8.

FIG. 11 discloses a modification of the sliding spacer 72. In this modification, a spacer 72a has oppositely tapered faces to the spacer 72, in other words, the spacer 72a is tapered outwardly in the elongated holes or slots which should now have oppositely tapered inner walls to those of the previously preferred embodiment. With this modification of the spacer 72a, the same functional features can be obtained as with the spacer 72.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A steering apparatus for a vehicle comprising:
a steering shaft assembly including a first shaft of which the lower end is foldably connected to a steering gear of the vehicle by way of a first universal joint and a second shaft of which the lower end is foldably connected to the upper end of said first shaft by way of a second universal joint and the upper end is connected to a steering wheel, said first shaft being axially displaceable relative to said second shaft,
a column tube assembly including an inner column tube coaxially surrounding and journalling said second shaft therein and separated at its lower end in a predetermined distance from the front wall of the vehicle compartment, an outer column tube coaxially surrounding said inner column tube therein and separated at its lower end in a predetermined distance from the front wall of the vehicle compartment, and an impact energy absorbing means between said inner and outer column tubes for absorbing a secondary impact energy exerted on said inner column tube from the steering wheel in a secondary collision;
a front supporting means mounted on a vehicle body structure for supporting the lower portion of said outer column tube and including means permitting forward displacement and disengagement of said outer column tube relative to said front supporting means by the secondary impact energy; and
a rear supporting means mounted on the vehicle body structure for supporting the upper portion of said outer column tube and including means permitting forward displacement of said outer column tube relative to said rear supporting means and comprising a pivot for said outer column tube in a secondary collision; whereby in a vehicle collision said outer column tube is displaced forwardly by the secondary impact energy exerted thereon and swings downwardly or upwardly around said pivot of said rear supporting means to effect said impact energy absorbing means.

2. A steering apparatus as claimed in claim 1, further comprising a second impact energy absorbing means interposed between the lower portion of said outer column tube and the vehicle body structure for absorbing the rotating force caused by the upward or downward swinging movement of said outer column tube.

3. A steering apparatus as claimed in claim 1, wherein said front supporting means comprises a pair of front brackets mounted on the vehicle body structure at their upper ends and provided thereon with a pair of elongated sliding slots to normally support the body sides of the lower portion of said outer column tube at their rear ends and to permit forward displacement and disengagement of said outer column tube relative to said front brackets in a secondary collision, and said rear supporting means comprises a pair of rear brackets mounted on the vehicle body structure at their upper ends and provided thereon with a pair of elongated sliding holes to normally support the both sides of the upper portion of said outer column tube at their rear ends and to permit forward displacement of said outer column tube relative to said rear brackets and provide a pivot for both sides of said outer column tube at their front ends in a secondary collision.

4. A steering apparatus as claimed in claim 3, further comprising a pair of impact energy absorbing members mounted at their upper ends on the vehicle body structure together with said front brackets and provided thereon with a pair of elongated sliding holes corresponding to said slots of said front brackets respectively and a plurality of slits to be expanded downwardly, the both sides of the lower portion of said outer column tube being normally supported by the rear ends of said slots through said holes of said energy absorbing members and received by the front ends of said holes of said energy absorbing members in the secondary collision.

5. A steering apparatus as claimed in claim 1, wherein said impact energy absorbing means is a cylindrical frictional element secured at its inner periphery on said inner column tube and frictionally engaged at its outer periphery with the inner periphery of said outer column tube.

6. A steering apparatus as claimed in claim 1, wherein said impact energy absorbing means is a cylindrical member secured at its both ends on said inner column tube and said outer column tube respectively and provided with a plurality of slits to be expanded forwardly.

7. A steering apparatus as claimed in claim 1, wherein said impact energy absorbing means comprises a plurality of slits on the lower portion of said outer column tube to be expanded forwardly, and said outer column tube being secured at its lower end to said inner column tube.

8. A steering apparatus as claimed in claim 1, wherein said first shaft of said steering shaft assembly comprises an upper shaft foldably connected at its upper end to the lower end of said second shaft by way of said second universal joint and a lower shaft foldably connected at its lower end to the steering gear by said first universal joint, said upper shaft being coaxially and slidably connected at its lower end to the upper end of said lower shaft by a shearable pin to provide the relative displacement between said first and second shafts.

9. A steering apparatus as claimed in claim 1, wherein said second universal joint of said steering shaft assembly includes means for shearably connecting the upper end of said first shaft to the lower end of said second shaft to provide the relative displacement of said first and second shafts.

* * * * *